US010463570B2

(12) United States Patent
Davies et al.

(10) Patent No.: US 10,463,570 B2
(45) Date of Patent: Nov. 5, 2019

(54) SYSTEM AND METHOD FOR MANUFACTURING AN IMPROVED FILM FOR MEDICAL SUPPLY PACKAGING

(71) Applicant: Advanced Films, LLC, Vancouver, WA (US)

(72) Inventors: Edward A. Davies, Pleasanton, CA (US); Bradley Abeson, Vancouver, WA (US)

(73) Assignee: Advanced Films, LLC, Vancouver, WA (US)

( * ) Notice: Subject to any disclaimer, the term of this patent is extended or adjusted under 35 U.S.C. 154(b) by 236 days.

(21) Appl. No.: 15/202,539

(22) Filed: Jul. 5, 2016

(65) Prior Publication Data

US 2017/0000690 A1 Jan. 5, 2017

Related U.S. Application Data

(63) Continuation-in-part of application No. 13/486,820, filed on Jun. 1, 2012, now abandoned.

(60) Provisional application No. 61/495,874, filed on Jun. 10, 2011.

(51) Int. Cl.
*A61J 1/10* (2006.01)
*B65D 65/40* (2006.01)
*B32B 27/08* (2006.01)
*B32B 7/12* (2006.01)
*B32B 27/32* (2006.01)
*B32B 23/08* (2006.01)
*B32B 27/34* (2006.01)
*B32B 27/36* (2006.01)
*B65B 9/08* (2012.01)
*B29C 48/10* (2019.01)
*B29C 48/00* (2019.01)
*B29C 48/14* (2019.01)
*B29C 48/21* (2019.01)
*B29C 48/28* (2019.01)
*B29C 48/355* (2019.01)
*B29C 48/49* (2019.01)
*B29C 48/90* (2019.01)

(52) U.S. Cl.
CPC *A61J 1/10* (2013.01); *B32B 7/12* (2013.01); *B32B 23/08* (2013.01); *B32B 27/08* (2013.01); *B32B 27/32* (2013.01); *B32B 27/327* (2013.01); *B32B 27/34* (2013.01); *B32B 27/36* (2013.01); *B65B 9/08* (2013.01); *B65D 65/40* (2013.01); *B29C 48/0018* (2019.02); *B29C 48/0019* (2019.02); *B29C 48/10* (2019.02); *B29C 48/1474* (2019.02); *B29C 48/21* (2019.02); *B29C 48/28* (2019.02); *B29C 48/355* (2019.02); *B29C 48/49* (2019.02); *B29C 48/903* (2019.02); *B29C 48/906* (2019.02); *B29C 2791/007* (2013.01); *B29C 2793/0063* (2013.01); *B32B 2270/00* (2013.01); *B32B 2307/306* (2013.01); *B32B 2307/31* (2013.01); *B32B 2307/72* (2013.01); *B32B 2307/7244* (2013.01); *B32B 2307/7246* (2013.01); *B32B 2439/46* (2013.01); *B32B 2439/80* (2013.01); *Y10T 428/2817* (2015.01)

(58) Field of Classification Search
CPC ... A61J 1/10; B32B 7/12; B32B 27/32; B32B 27/08; B32B 2439/80; B32B 2307/31; B65D 65/40
See application file for complete search history.

(56) References Cited

U.S. PATENT DOCUMENTS

| | | | |
|---|---|---|---|
| 4,778,697 A | 10/1988 | Genske et al. | |
| 5,783,269 A * | 7/1998 | Heilmann | B32B 27/32 428/35.2 |
| 6,303,680 B1 | 10/2001 | Neiss | |
| 8,202,001 B1 | 6/2012 | Zhang | |
| 2002/0058127 A1 | 5/2002 | Itada et al. | |
| 2002/0142115 A1 | 10/2002 | Sugiura | |
| 2004/0023054 A1 | 2/2004 | Wolak | |
| 2005/0119413 A1 | 6/2005 | Maziers | |
| 2009/0104467 A1 | 4/2009 | Son et al. | |
| 2010/0015423 A1* | 1/2010 | Schaefer | B32B 27/08 428/216 |

FOREIGN PATENT DOCUMENTS

| | | |
|---|---|---|
| JP | 2005289471 A | 10/2005 |
| JP | 2005335134 A | 12/2005 |
| WO | WO 2009154939 A1 | 12/2009 |

OTHER PUBLICATIONS

Machine translation of JP 2005289471 A, retrieved Feb. 12, 2015.
Polymer Plastics Company, 2000 (http://web.archive.org/web/20000615000000*/http://www.polymerplastics.com/corrosion_polyeth.shtml).
Machine translation of JP205335134 A, retrieved Oct. 22, 2013.

* cited by examiner

*Primary Examiner* — Robert D Harlan
(74) *Attorney, Agent, or Firm* — Kang S. Lim

(57) ABSTRACT

Systems and methods for generating a film suitable for medical packaging are provided. The film is generated by blown film co-extrusion to form a multi-layer film which has a heat resistant layer, a barrier layer and a heat seal layer. The barrier layer includes a high barrier resin and a branched co-polymer. The high barrier resin has a density of at least 0.963 g/cm$^3$. The barrier layer includes between 25% and 85% high barrier resin. In some embodiments, an additional laminate layer may be affixed to the heat resistant layer of the multi-layer film. The final film is between 3.0 and 3.8 mils in thickness, and has a moisture vapor transmission rate of less than 0.08.

8 Claims, 14 Drawing Sheets

1-Octene Monomer

Ethylene Monomer

SYSTEM AND METHOD FOR MANUFACTURING AN IMPROVED FILM FOR MEDICAL SUPPLY PACKAGING

CROSS REFERENCE TO RELATED APPLICATIONS

This application is a continuation-in-part of application Ser. No. 13/486,820, filed on Jun. 1, 2012, currently pending, which is a non-provisional of provisional application No. 61/495,874, filed on Jun. 10, 2011, expired, which applications are incorporated herein in their entirety by this reference.

BACKGROUND

The present invention relates to a system and methods for generating unique films for packaging of medical supplies. The films disclosed herein must be able to be autoclaved in order to sterilize the medical supplies. Additionally, the films, when manufactured into a packaging must be durable enough to protect the contents and have a low permeability to moisture.

Packages made from polymer films are known in the medical device and supply industry. These film packages are traditionally thermo sealed pouches containing the medical supply. The entire packaged medical supply is then subjected to autoclaving in order to sterilize the supplies. In some cases, the medical supplies may be irradiated within the packaging or, alternatively, chemically sterilized.

Traditionally, polyethylene or polypropylene are common substances utilized as films for medical device packaging. The typical film material used in medical supply packaging is a single layer of High Density Polyethylene (HDPE). These films are durable, and when manufactured to a proper thickness, provide the needed moisture barrier required for packaging moisture dependent medical supplies. For example, Intravenous (IV) bags containing saline or glucose solutions require a very low moisture transmission rate out of the packaging material because solution concentration and final volume are reliant upon not loosing moisture over time. However, thick HDPE films has drawbacks in terms of workability and cost due to film thickness. As such, alternate films have been developed.

A class of such films includes co-extrusion of differing densities of polyethylene materials in a single film, a procedure pioneered by the inventors of this disclosure. These films typically include two or more layers of polyethylene, each layer has a different density mixture designed to impart moisture resistance and strength. Additionally, by making the heat resistant layer having a higher melting temperature than the heat seal layer, it is possible to have greater tolerance during manufacturing. Additionally, this enables the sealing temperature to be lower than the melting temperature of the heat resistant layer of the film. By increasing manufacturing tolerances, it is possible to reduce packaging failures, which is particularly costly in the medical supply industry.

While past improvements made in films have improved failure rates in medical supply packaging, there remains room for further improvements. Additionally, there is a constant pressure to reduce material cost while still increasing performance.

It is therefore apparent that an urgent need exists for further improved polymer films for packaging in the medical supply industry which are low cost, provide low failure rates, and provide low moisture transmission.

SUMMARY

To achieve the foregoing and in accordance with the present invention, a system and method for generating a film suitable for medical packaging is disclosed. Such a film and medical packaging would be useful in association with a medical supply. The film provides superior burst resistance over traditional medical packaging films, as well as superior moisture vapor transmission rate, cost reduction and increased processing window.

The film is generated by co-extrusion (often blown bubble co-extrusion) to form a tri-layer film which has a heat resistant layer, a barrier layer and an heat seal layer. The barrier layer includes a high barrier resin and an octene linear low density polyethylene. The high barrier resin has a density of at least $0.966$ $g/cm^3$. In some embodiments, the barrier layer includes between 25% and 85% high barrier resin. In some particular embodiments, the barrier layer includes about 80% high barrier resin and about 20% linear low density polyethylene.

The heat resistant layer may be comprised of about 100% high density polyethylene, a combination of high density polyethylene and octene linear low density polyethylene, or polypropylene. The heat seal layer, in some embodiments, comprises a combination of high density polyethylene and medium density polyethylene, or high density polyethylene alone.

In some embodiments, an additional primary substrate layer may be affixed to the heat resistant layer of the tri-layer film to form a laminate. The primary substrate may be connected to the film utilizing and epoxy adhesive. Primary substrates may include any of nylon, cast polypropylene, polyethylene terephthalate, and oriented polypropylene.

The final film is between 2.8 and 4.1 mils in thickness, depending upon lamination and co-extrusion conditions, and has a moisture vapor transmission rate of less than 0.08.

After formation of the three or more layer film (with or without a primary substrate layer), it may be supplied to a horizontal form, fill and seal device which is able to form the co-extruded tri-layer film around a medical supply. The machine may then seal the co-extruded film around the medical supply to generate a medical supply package. Typically sealing is performed via heat sealing.

Lastly, the medical supply within the film package may be sterilized via autoclave or other suitable sterilization technique. The sterilized medical supply is then ready for sale to the consumer.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION OF THE INVENTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "only," "first," "initially," "next," "subsequently," "before," "after," "lastly," and "finally," are not meant to limit the scope of the present invention as the embodiments disclosed herein are merely exemplary.

The present invention relates to a system and methods for manufacturing improved film products for packaging medical supplies. The disclosed films provide superior moisture barrier protection, decreased costs due to material reduction, and reduced failure rates due to improvements in the manufacturing tolerances. Particularly, the disclosed films enable larger temperature variance during thermo sealing of the film over traditional films. Due to this increased tolerance of temperature variation, there is a reduced likelihood of improper or incomplete sealing and therefore reduced failure of the final packaging material.

The following description of some embodiments will be provided in relation to numerous subsections. The use of subsections, with headings, is intended to provide greater clarity and structure to the present invention. In no way are the subsections intended to limit or constrain the disclosure contained therein. Thus, disclosures in any one section are intended to apply to all other sections, as is applicable.

I. Overview

Figure 1:
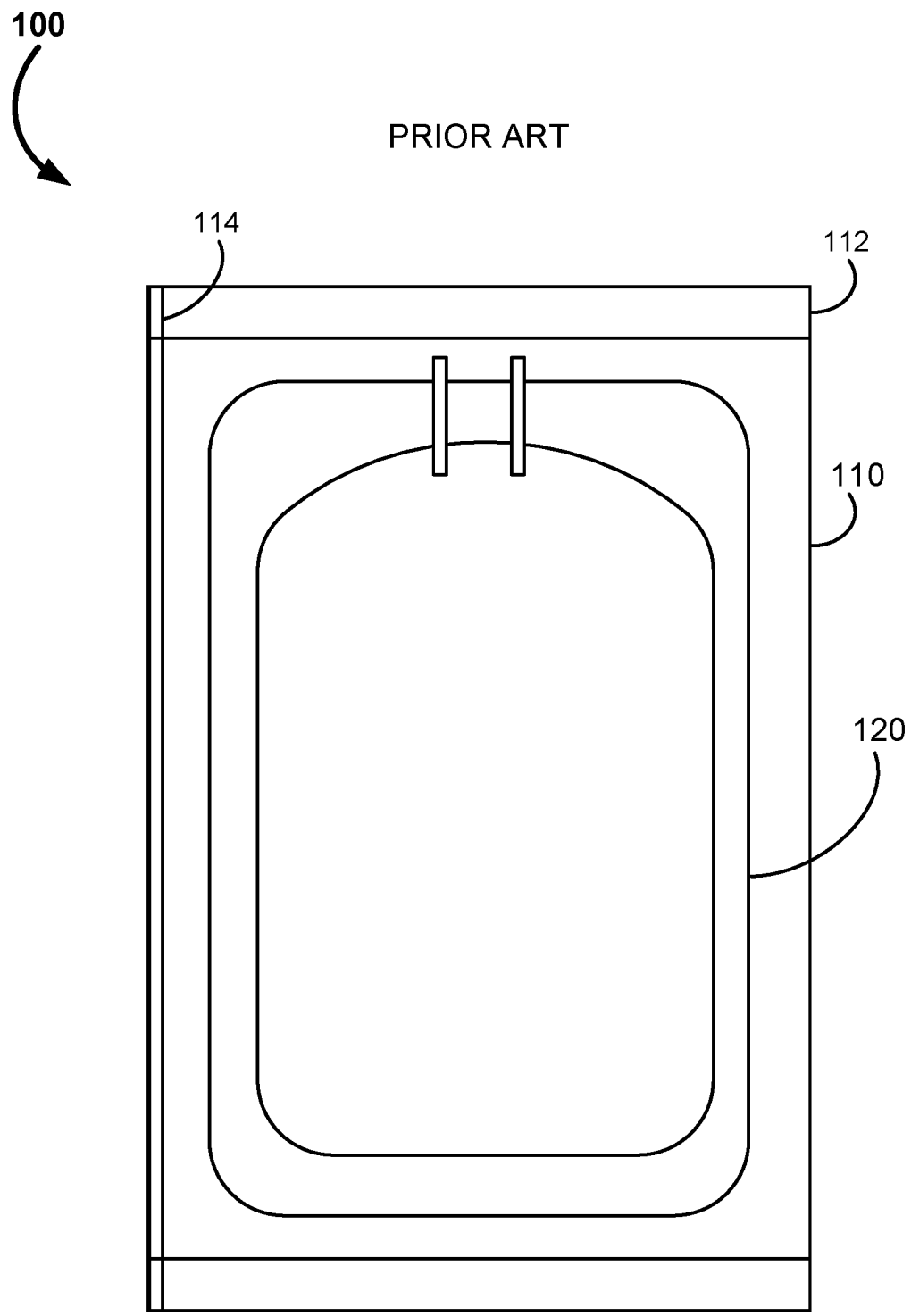
FIG. 1 is a schematic view of a medical supply within a thermo sealed film pouch suitable for sterilization, in accordance with some embodiment.

To facilitate the discussion, FIG. 1 is a schematic view of a medical supply within a thermo sealed film pouch suitable for sterilization, shown generally at 100. In this particular example, an intravenous (IV) bag 120 is illustrated within the packaging pouch 110. Intravenous bags are typically prefilled to a required volume and may contain a saline or glucose solution. Additional solutions may likewise exist within the IV bag. The IV bag 120, or other medical supply or device, is packaged within a pouch 110 made from a film material. Traditionally, the film may be comprised of polyethylene or other suitable material. Examples of known films utilized for packaging medical supplies are provided in greater detail below.

The film pouch 110 includes at least three welds (or seals). These include a longitudinal (or side) seal 114, and a top and bottom seal 112. Generally, a pouch of this sort will be formed utilizing a horizontal form, fill and seal (HFFS) device, which will be described in greater detail below. After being packaged within the pouch 110, the entire packaged material may be subjected to sterilization.

Sterilization typically includes heating within an autoclave to above 119-123° C. for at least 30 minutes at increased pressure to prevent packaging bursting. Alternatively, in some cases, other sterilization methods may be utilized. For example, ethylene oxide may be utilized for sterilization of medical supplies and devices when the supplies cannot be heated, won't retain the gas, and the packaging is permeable to the ethylene oxide gas. Alternatively, irradiation from a gamma radiation source may be utilized, in some embodiments, in order to sterilize the medical supplies. Packaging film may be adversely affected by irradiation, in some embodiments. For example, polyethylene when irradiated may experience chain breakage as a result of the irradiation. If oxygen is present, the loose chain ends may combine with oxygen thereby causing the polyethylene film to become more brittle. In the absence of oxygen, the free chains may bond to other polyethylene strands, thereby altering the material to be stronger and more flexible. Generally, dependent upon the sterilization technique being employed, the medical device packaging film's composition may be altered to be optimized for the sterilization technique. For the remainder of this application particular emphasis will be placed upon heat sterilization, by way of an autoclave, due to the fact that it is the most common sterilization technique. This does not, in any way, imply that other sterilization methods cannot be employed in conjunction with the disclosed film packaging. Rather, the emphasis on autoclave sterilization is done for clarity of the disclosure.

After sterilization, the medical supply within the film packaging may be provided to a hospital or other end user. The package may include uneven cuts along the top and bottom seals in order to facilitate tearing the outer packaging in order to access the sterilized supplies. Often the medical supplies are stored for a considerable period of time. For this reason, it is of paramount importance that the packaging be strong enough to withstand not only sterilization but inadvertent tearing during handling and storage. Further, it is also necessary that the packaging has a suitably low moisture transmission rate in order to maintain liquid volumes of the medical supplies. This may be of particular importance, for example, where the medical supplies are filled IV bags including saline or glucose solutions. If water is able to migrate out of the packaging over the storage period, this may negatively alter total volume and solution concentrations. Given the sensitivity of medical supplies, even small changes in fluid volumes is unacceptable. Thus, the packaging must balance cost of production with durability, resistance to failure during sterilization, and low permeability to moisture.

Given these considerations, a number of medical device packaging materials have become commonplace. These predominantly include specially formulated papers and plastics. Plastics often are in the form of films or membranes. Common plastic films include polyethylene films, polypropylene films, nylon and polyethylene terephthalate, for example. Particular attention will be paid to polyethylene films, as these have been found to be well suited for pouch type medical device packaging.

Figure 5:
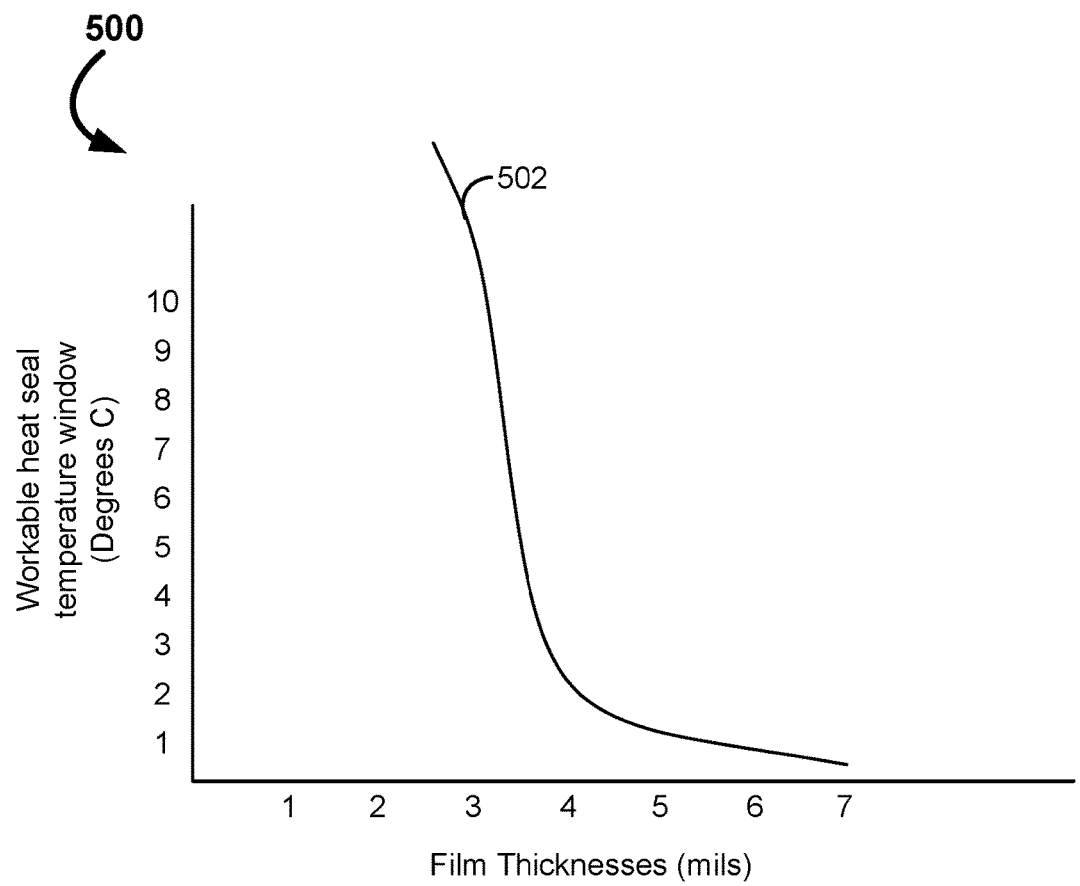
FIG. 5 is a representational diagram of high density polyethylene, in accordance with some embodiment.

FIG. 5 is a representational diagram of High Density Polyethylene (HDPE), shown generally at 500. High Density Polyethylene is composed of long un-branched carbon chains. There is little cross linkage between polyethylene molecules, and these molecules tend to lie in parallel. The geometry of the polyethylene molecules causes the film to have a high tensile strength due to intermolecular forces. Additionally, the density of the thermoplastic is higher than branched lower density variants. High density polyethylene is capable of withstanding temperatures of up to 132° C. for short periods of time. The density of HDPE is typically greater than 0.950 g/cm$^3$.

Figure 6:
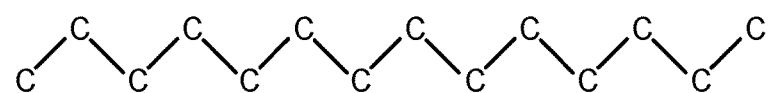
FIG. 6 is a representational diagram of the chemical structure of a segment of a polyethylene chain, in accordance with some embodiment.

FIG. 6 is a representational diagram of the chemical structure of a segment of a polyethylene chain. High density polyethylene molecules are long hydrogenated single carbon chains without significant branching, as illustrated. A single polyethylene molecule may be many hundreds or thousands of carbons in length. By contrast, lower density polyethylene may include molecules which branch.

Figure 7A:
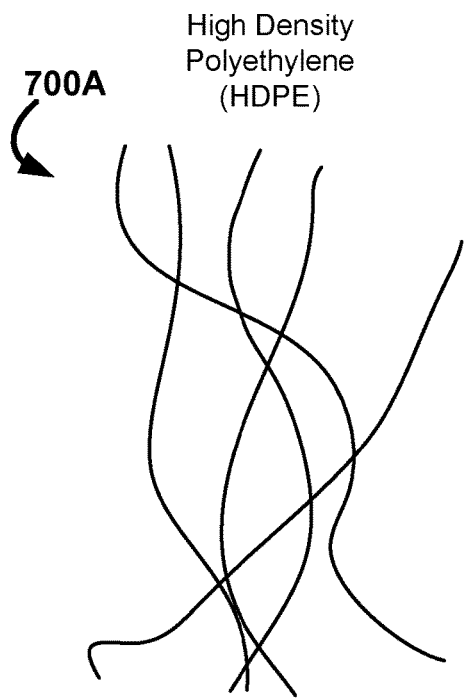
FIGS. 7A and 7B are representational diagrams of octene linear low density polyethylene, in accordance with some embodiment.
Figure 7B:
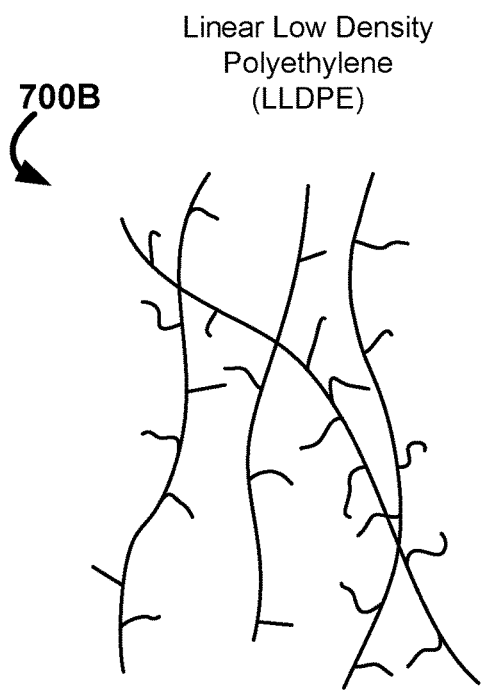

FIGS. 7A and 7B are representational diagrams of Linear Low Density Polyethylene (LLDPE), shown generally at 700A and 700B. Linear low density polyethylene is a substantially linear polymer with significant numbers of short branches, commonly made by co-polymerization of ethylene with longer-chain olefins. Linear low density polyethylene differs structurally from conventional low-density polyethylene because of the absence of long chain branching. The linearity of LLDPE results from manufacturing at lower temperatures and pressures by copolymerization of ethylene and such higher alpha olefins as butene, hexene, or octene. The copolymerization process produces an LLDPE polymer that has a narrower molecular weight distribution than conventional LDPE, and in combination with the linear structure, significantly different properties. For example, LLDPE has a higher tensile strength than traditional LDPE, and may form thinner films. For the purposes of packaging film for the medical device industry, the resistance of LLDPE to stress cracking and thinner film formation may be particularly pertinent.

In some embodiments, Octene Linear Low Density Polyethylene (O-LLDPE) may be of particular use. Octene linear low density polyethylene has a melting temperature of between 120 and 160° C. and has a density of approximately 0.920 g/cm$^3$. O-LLDPE is generated by the co-polymerization of ethylene monomers with octene monomers.

Figure 8:
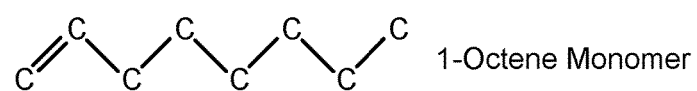
FIG. 8 is a representational diagram of the chemical structures ethylene monomer and octene monomer, in accordance with some embodiment.
Figure 8:

FIG. 8 is a representational diagram of the chemical structures ethylene monomer and octene monomer. Ethylene consists of two carbons double bonded to one another. The chemical structure of ethylene is $C_2H_4$. Octene, by contrast, is an eight carbon chain with a double bond between the first and second carbons. The chemical structure of octene is $C_8H_{16}$. During polymerization the double bonds between the carbons are broken and new single bonds are generated between monomers. When a small percentage of octene monomers are combined with ethylene monomers (typically between 8-10% octene), these molecules are incorporated into the polymer chain thereby resulting in short branched carbon chains extending off of the length of the polymer.

In addition to high density polyethylene and linear low density polyethylene, often Medium Density Polyethylene (MDPE) is utilized in the formation of films for medical supply packaging. Medium density polyethylene is defined as a polyethylene having a density of between 0.926-0.940 g/cm$^3$. MDPE has better crack resistance than HDPE, as well as notch resistance.

Below is provided particular film compositions, both known and novel. These films may be tailored to meet any desired end use application. Generally, medical packaging is required to have a very low moisture vapor transmission rate, heat resistance and general durability. Additionally, the ability to manufacture packaging with resilient seals is of paramount importance.

II. Improved Film

Figure 2A:
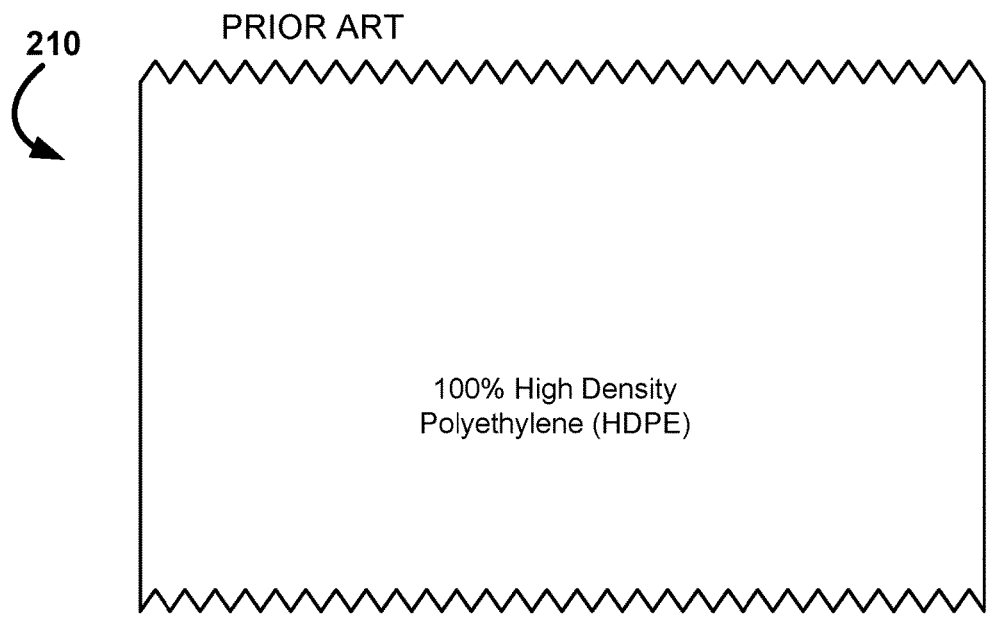
FIGS. 2A and 2B are example cross sectional views of a portion of known films for use in packaging of medical supplies, in accordance with some embodiment.

In this section will be described various films utilized for medical device and supply packaging. One of the first films utilized regularly and successfully in medical supply packaging is a pure high density polyethylene film. This film may be seen in relation to FIG. 2A at 210. While the manufacturing of pure high density polyethylene film is considerably easier than later approaches, this film has drawbacks in terms of film thickness, heat seal fidelity, and brittleness resulting in packaging failures.

Figure 2B:
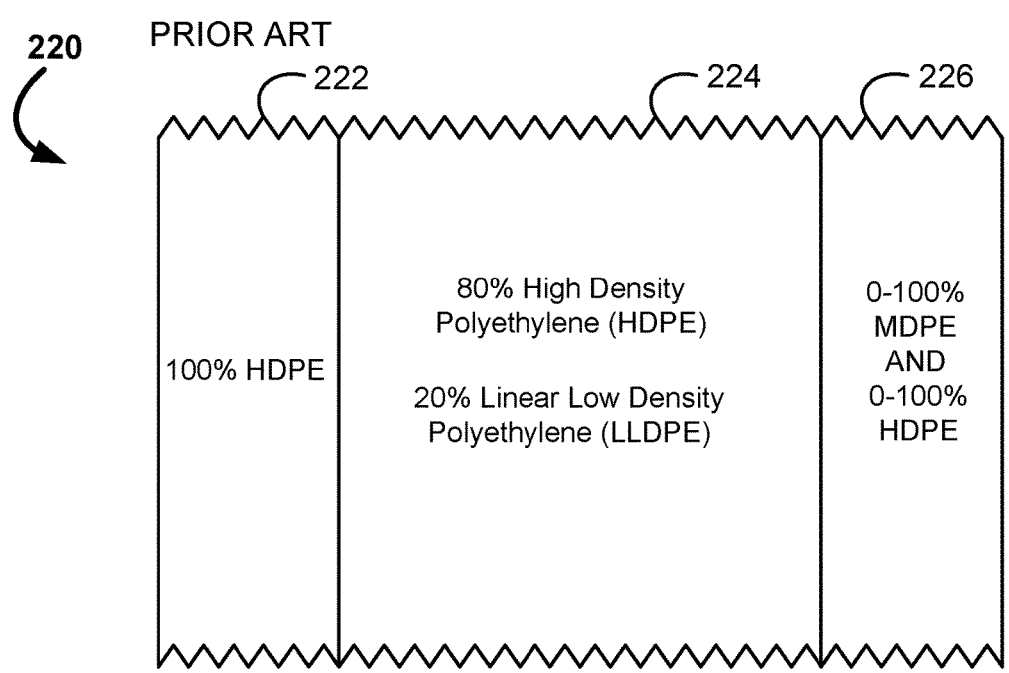

In an effort to address some of the drawbacks associated with pure HDPE films, the inventors of this disclosure generated films which incorporate multiple co-extruded layers. An example of their initial co-extruded film is seen at FIG. 2B at 220. In this at least three layered film an heat resistant layer 222 of high density polyethylene is followed by a center layer 224 of a combination of high density polyethylene with linear low density polyethylene. Typically the center layer has a ratio of 80% HDPE to 20% LLDPE, however any suitable ration may be utilized. Often the LLDPE may be an octene linear low density polyethylene O-LLDPE. This layer is followed by a heat seal layer 226 of medium density polyethylene and high density polyethylene at 90% and 10%, respectively, although other ratios are possible.

One benefit of co-extrusion in this manner is that, in comparison with a single phase HDPE film, the brittleness of the film was reduced, and heat seal fidelity was improved. This is due to the fact that the outside of this layered film has a higher melting temperature as compared to the heat seal layer, approximately 132° C. on the outside compared with 121° C. on the heat seal layer. Thus, during heat sealing the external film surface may remain solid while the interior surface is melted in order to fuse together. This film design, at a thickness of 3-5 mils, enables the heat sealer to operate with a 1-2° C. process window, which was an improvement over prior single layer films. The failure rate of this advanced and proprietary film is around 5%, which is significantly less than the failure rate of a pure HDPE monolayer which fails at a rate of about 20%. However, despite these advances the failure rate is still undesirably high. This stems primarily from the relatively narrow process window of 1-2° C. Anything outside of this tolerance may cause the film to fail at the seal.

Thus, it is evident that an even further improved film is required to reduce failure rates of medical supply packaging. One such novel film class is provided at FIG. 3, seen generally at 300. This film is similar to the initially designed co-extruded film types in that it also has a three layer design; however, it differs in the core layer composition and ultimately in the overall film thickness. Note that while a three layer design is provided for reference, additional layers may be co-extruded as desired for strength, moisture barrier and other desired characteristics.

In this novel film class, an outside heat resistant layer 302 of high density polyethylene is seen. The middle core barrier layer 304 includes a High Barrier Resin (HBR) in combination with low linear density polyethylene. In some embodiments the LLDPE includes an octene low linear density polyethylene. The percentage of HBR to LLDPE may be anywhere from 25-85% HBR, in some embodiments, based upon final film thickness and other desired properties. Lastly, the film includes an inside heat seal layer 306 of medium density polyethylene and high density polyethylene at 90% and 10%, respectively, in some embodiments. In some other embodiments, the heat seal layer 306 may include between 0% to 100% high density polyethylene and 0-100% medium density polyethylene in any desired ratio for balancing heat sealing properties and barrier properties.

High barrier resin may include a polyethylene compound with a density rating of greater than 0.959 and above. This leads to a material with an improved resistance to moisture transmission. Alternatively, the high barrier resin may include some other polymer compound which exhibits ultra density and ultra low moisture transmission rating.

The film described herein exhibits excellent bonding and heat resistant properties and meets the most exacting requirements for horizontal form fill and seal applications requiring a heat resistant outer layer and inside heat seal layer. Alternatively, the disclosed film may be ideally suited for vertical fill pouches, and premade pouch designs.

This co-extruded film is designed to withstand a heat sterilization internal temperature greater than 119° C., acceptable moisture barrier needed for shelf life of the packed product and a heat resistant outer layer with a melting point greater than the internal heat seal layer so that a hermetic seal may be formed. For many embodiments of the co-extruded film a moisture vapor transmission rate of less than 0.08 g/100 sq.in./24 hrs/atm. At 100° F. and 90% RH.

Figure 3:
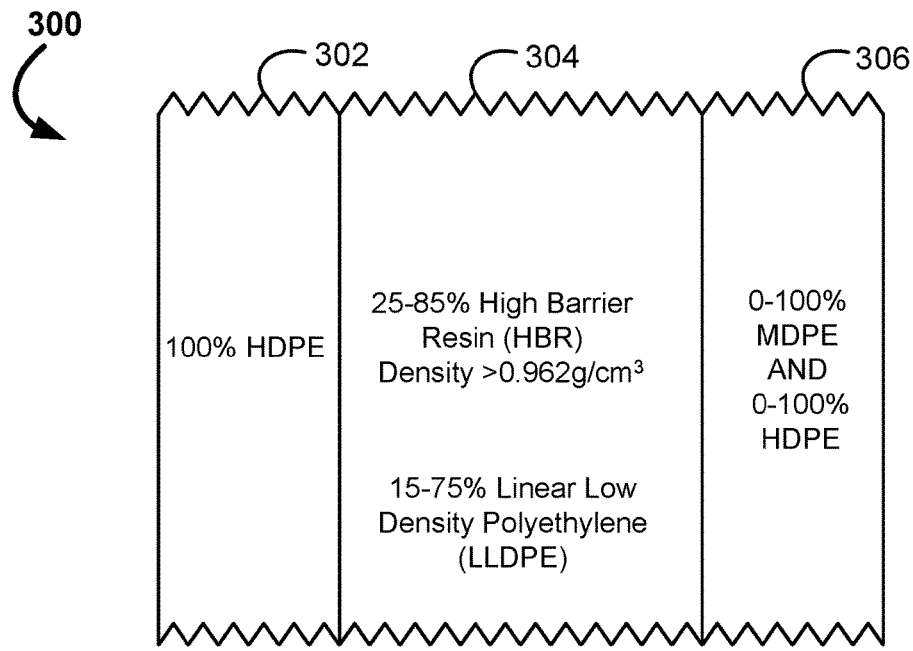
FIG. 3 is an example cross sectional view of a portion of a novel improved film for use in packaging of medical supplies, in accordance with some embodiment.
Figure 4:
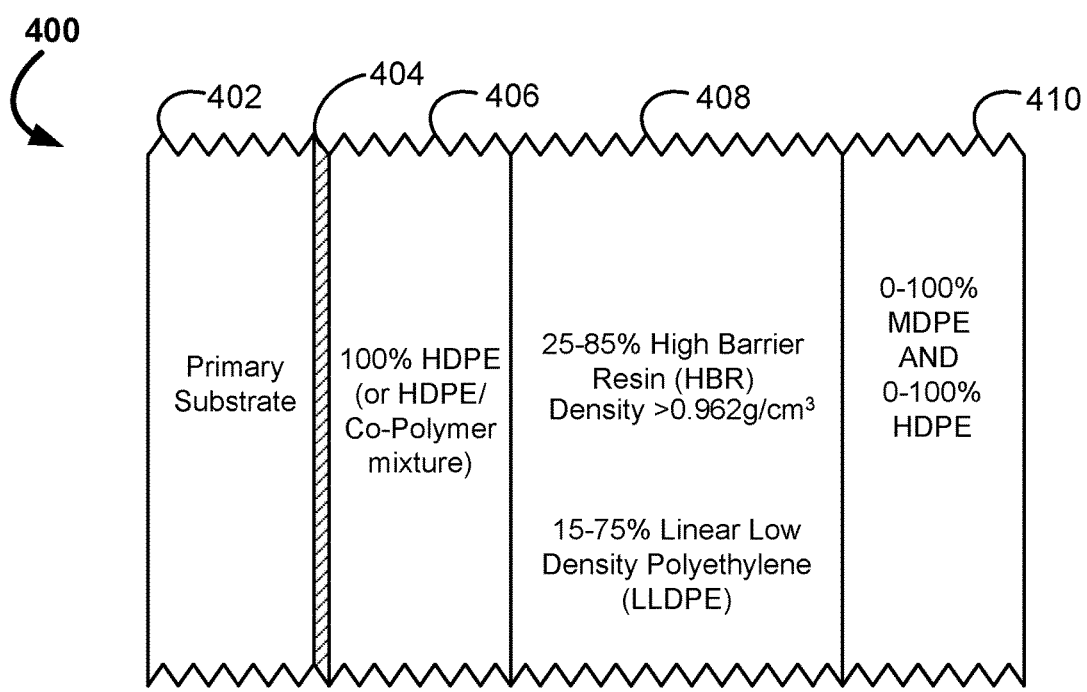
FIG. 4 is an example cross sectional view of a portion of a novel improved laminate film for use in packaging of medical supplies, in accordance with some embodiment.

Similarly, FIG. 4 is an example cross sectional view of a portion of a novel improved laminate film for use in packaging of medical supplies, shown generally at 400. This laminate film includes a film with three co-extruded layers similar to that of FIG. 3. However, in addition to the outside heat resistant HDPE layer 406, the HBR and LLDPE core barrier layer 408 and inside heat seal MDPE and HDPE layer 410, this film also includes a primary substrate 402 applied to the co-extruded film. An epoxy adhesive 404 bonds the primary substrate 402 to the co-extruded film. Further, the heat resistant layer may also include a HDPE and LLDPE mixture in some embodiments. Additionally, in some embodiments, the inside heat seal layer 410 may be between 0% to 100% HDPE. In a particular embodiment, the heat seal layer 410 may be 75% HDPE and 25% MDPE.

The primary substrate may include any of a nylon, a Cast Polypropylene film (CPP), a polyethylene terephthalate (PET), Oriented Polypropylene (OPP), or other suitable material. Generally the primary substrate layer exhibits excellent physical properties, barrier qualities, and heat resistance. By applying the primary substrate 402 to the co-extruded layer, a thinner film can be produced while still maintaining durability and a low moisture vapor transmission rating (MVTR).

In some embodiments, the direction of the primary substrate may be adhered perpendicularly to the co-extruded film. The enables generally higher burst strength of the final laminate, but still enables easy tearing properties along the primary substrate's orientation. Thus a more durable film pouch may be generated that is still able to be easily torn open by a user.

Figure 17:
FIG. 17 is an example table illustrating embodiments of film construction and composition, in accordance with some embodiment.

FIG. 17 provides a table detailing various example formulations for embodiments of the novel films exemplified by FIG. 3 and FIG. 4. In this example, the first column 1702 provides a formulation identifier. Column 1704 provides a range for the total film thickness. Column 1706 provides primary substrate material and thickness (gauge), where applicable. Column 1708 indicates adhesive layer thickness, where applicable. Column 1710 indicates the formulation for the outside heat resistant layer (laminate contact layer). Column 1712 provides formulations for the middle barrier core layer, and column 1714 indicates formulation for the interior heat seal layer.

The first formulation illustrated on the table of FIG. 17 is the known monolayer film which typically includes a 5 mil or thicker film of HDPE. Following is the initially formulated co-extruded film seen exemplified in FIG. 2B. This film varies between 4.1 and 4.4 mils in thickness, in these embodiments, making it thicker than any of the later novel film products (even the four layer laminated products). However, in comparison to known mono-layer HDPE films, even this early proprietary film is thinner and has better physical properties. In these embodiments, The outside heat resistant layer is seen as including 100% HDPE, a middle barrier layer of 80% HDPE and 20% LLDPE, and an inside heat seal layer of 90% MDPE and 10% HDPE.

Other film embodiments range in film thickness, primary substrate type and thickness (where applicable), outside heat resistant layer compositions, middle barrier layer composition and even interior heat seal layer compositions. Each formulation provides differing processing conditions, durability, heat resistance, and moisture vapor transmission ratings. However, a commonality between each of the provided formulations is a reduction in overall thickness when compared to the known monolayer films, or even the initial co-extrusion, and a low moisture vapor transmission rating or 0.08 or less.

In some embodiments, the primary substrate may include a polyethylene terephthalate (PET) film with a thickness of between 36 and 60 gauge. In an alternate embodiment, the PET primary substrate may be between 40-56 gauge. In an alternate embodiment, the PET primary substrate may be between 44-52 gauge. In an alternate embodiment, the PET primary substrate may be 48 gauge. The primary substrate may be adhered to the coextruded polymer with an adhesive at a thickness of 0.1 mils, or at 1.6 pounds per square meter. The adhesive may include a two part polyurethane adhesive.

In some embodiments, the coextruded polymer may include a sealing layer of between 60-80% HDPE and 40-20% MDPE. In alternate embodiments, the sealing layer may be between 65-75% HDPE and 35-25% MDPE. In alternate embodiments, the sealing layer may be 70% HDPE and 30% MDPE.

In some embodiments, the coextruded polymer may include a middle barrier layer of between 70-90% the high barrier polyethylene and 10-30% of a LLDPE. In alternate embodiments, the barrier layer may be between 75-85% high barrier polyethylene and 15-25% LLDPE. In alternate embodiments, the barrier layer may be 80% high barrier polyethylene and 20% LLDPE. The density of the high barrier polyethylene for these embodiments may be at least 0.966 g/cm$^3$. In some embodiments it may be beneficial to have the LLDPE be a single-site LLDPE (sLLPE) with a density of approximately 0.916 g/cm$^3$. The LLDPE of the barrier layer may also be a metallocene polyethylene.

In some embodiments, the coextruded polymer may include an outside heat resistant layer (laminated to the PET film) of between 60-80% HDPE and 40-20% LLDPE. In alternate embodiments, the outside layer may be between 65-75% HDPE and 35-25% LLDPE. In alternate embodiments, the outside layer may be between 70% HDPE and 30% LLDPE.

In some embodiments, the coextruded polymer may have a ratio of 10-30% sealing layer thickness, between 40-80% barrier layer thickness, and 10-30% outside layer thickness. In an alternate embodiment, the coextruded polymer may have a ratio of 15-25% sealing layer thickness, between 50-70% barrier layer thickness, and 15-25% outside layer thickness. In an alternate embodiment, the coextruded polymer may have a ratio of 20% sealing layer thickness, between 60% barrier layer thickness, and 20% outside layer thickness. The coextruded polymer may have a thickness of between 3.4 and 3.6 mils. Alternatively, the coextruded polymer may have a thickness of between 3.45 and 3.55 mils. Alternatively, the coextruded polymer may have a thickness of 3.5 mils.

In order to provide clarification, an example of one embodiment is provided including a PET primary substrate of approximately 48 gauge, approximately 0.1 mil adhesive layer, and a coextruded polymer of approximately 3.5 mils thick. For the purpose of this application, the term "approximately" means within a 8% margin of error due to manufacturing variation. Thus the 3.5 mil coextruded film may be between 3.22 and 3.78 mils. The coextruded polymer includes a sealing layer of 70% HDPE and 30% MDPE, a barrier layer of 80% high barrier polyethylene and 20% LLDPE, and a heat seal layer may be between 70% HDPE and 30% LLDPE. The ratio of thickness between the sealing, barrier and heat seal layer is 20-60-20. Thus, for this example, the sealing layer is approximately 0.7 mils thick, the barrier layer is approximately 2.1 mils thick, and the heat seal layer is approximately 0.7 mils thick. Thus, this final film has a thickness of approximately 4.1 mils. This example film provides a calculated MVTR of approximately 0.059 g/100 in$^2$/d/atm for the coextruded film. Including the PET laminate, the MVTR is further reduced to approximately 0.058 g/100 in$^2$/d/atm. The process window (i.e., the temperature variation tolerance of the heat seal rollers to generate a proper heat seal) for this coextruded film is 10° C. and higher for the PET laminated film.

By reducing overall film thickness, a material cost savings is realized. In general, the embodiments disclosed herein reduce overall materials by about 20% which translates into a 10% reduction in material costs. Moreover, in addition to the foreseeable cost savings, unexpectedly there was an improvement in process window when the film's thickness is reduced. For example, the initial co-extruded film with a middle core of 80% HDPE and 20% LLDPE has a thickness of 4.25 mils in order to achieve the necessary durability and moisture vapor transmission rating. In contrast, some embodiments of the co-extruded multilayer film are only 3.4-3.6 mils in thickness to achieve similar durability and a MVTR of 0.08. The process window for the initial co-extrusion film is 1-2° C. (i.e., the temperature variation tolerance of the heat seal rollers to generate a proper heat seal). In contrast, the thinner co-extruded film disclosed herein has a process window of about 10° C. For laminated formulations, this process window increases even further.

This larger process window results in a dramatic reduction in package failure rates, with good manufacturing procedures. In fact, while traditional film based medical supply package failure rate is between 5-20%, failure rate for packages manufactured using these novel formulations is nearing zero. As packaging failures accounts for a large portion of lost revenue for the medical supply industry, this reduction in failure due to the expanded process window is of paramount importance.

Figure 9:
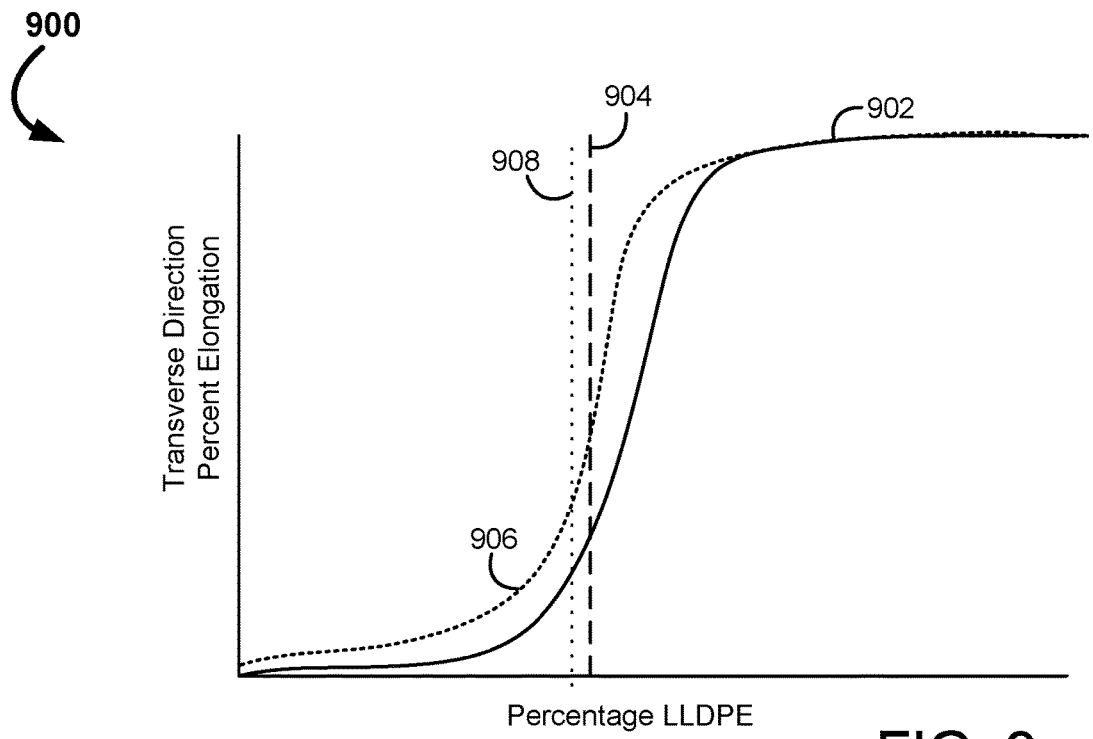
FIG. 9 is a representational diagram of the transverse directional percent elongation within a polyethylene film including high barrier resin and low density polyethylene as a percentage of the LLDPE, in accordance with some embodiment.

In understanding the constraints placed upon film formulations, FIG. 9 is a representational diagram of the transverse directional percent elongation within a polyethylene film including high barrier resin and low linear density polyethylene as a percentage of the LLDPE, shown generally at 900. Traverse direction percent elongation is a convenient method of quantitatively measuring film durability and resistance to cracking. The test often utilized to measure film durability is a whole box drop assay to test hydraulic burst/rupture of packaging. The curve 902 sharply increases to a high traverse direction percent elongation as the percentage of low linear density polyethylene increases. In some embodiments, there is a minimum threshold 904 of traverse direction percent elongation that needs to be met to ensure the film does not crack or rupture.

Figure 10:
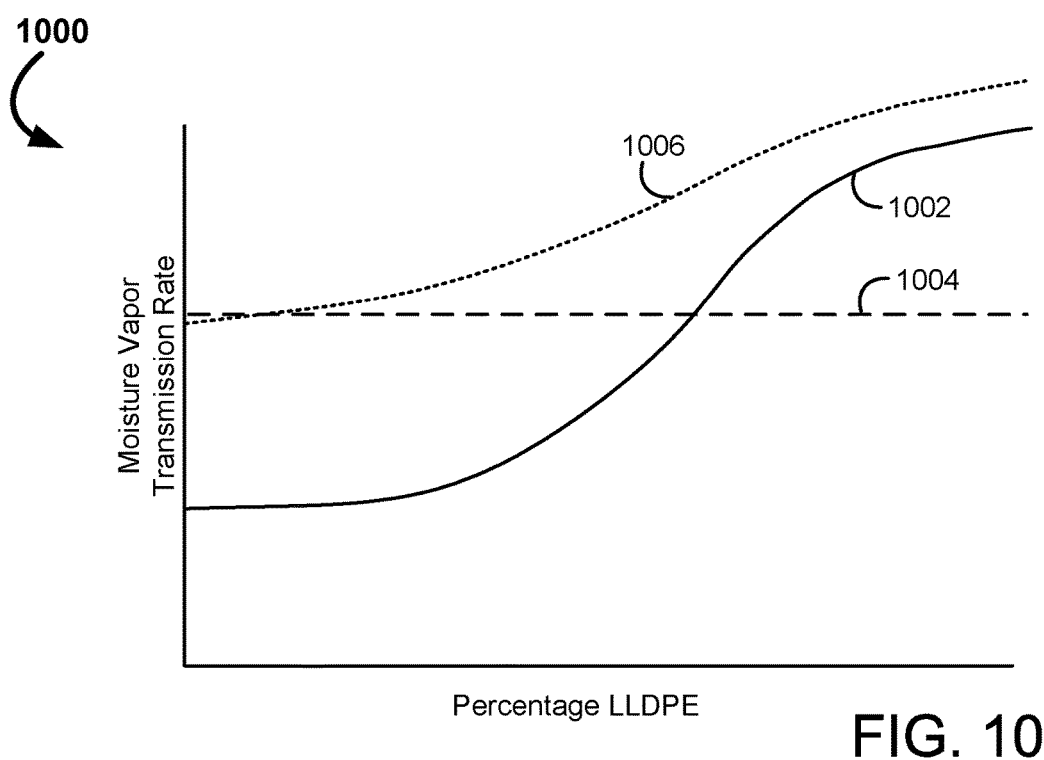
FIG. 10 is a representational diagram of the moisture vapor transmission rate of a polyethylene film including high barrier resin and low density polyethylene as a percentage of the LLDPE, in accordance with some embodiment.

In contrast, FIG. 10 is a representational diagram of the Moisture Vapor Transmission Rate (MVTR) of a polyethylene film including high barrier resin and low density polyethylene as a percentage of the LLDPE, shown generally at 1000. The curve 1002 indicates that the moisture transmission also increases as the percentage of LLDPE increases and high barrier resin levels are decreased. This is because the high density of at least 0.959 g/cm$^3$ for the high barrier resin acts to block moisture transmission very effectively, whereas the LLDPE is less effectual at prevention of moisture transmission. For medical supplies it is necessary to have a maximum threshold 1004 for the moisture vapor transmission rate of the film. Generally, medical supplies are required to be able to be kept at storage for a two year period without any appreciable loss of water volume during this time. Greater water loss may effect concentration of IV fluids, and requires an increase in fill. Even minor increases in fill levels results in a major cost burden upon medical suppliers, and is thus undesirable.

Figure 11A:
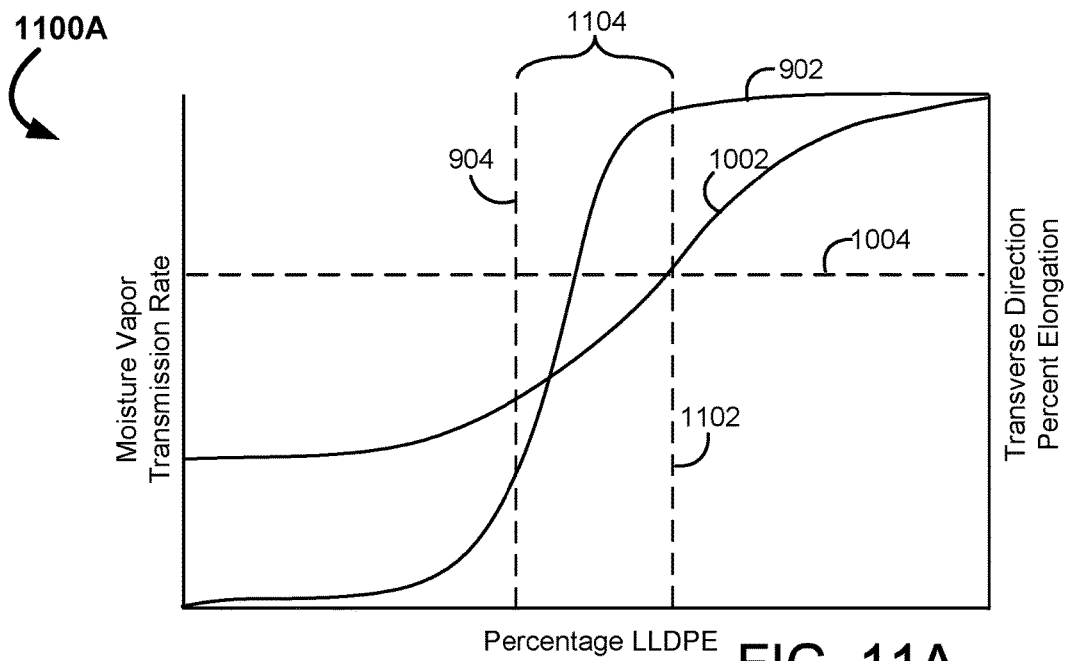
FIGS. 11A and 11B are representational overlay diagrams of the moisture vapor transmission rate and the transverse directional percent elongation of a polyethylene film including high barrier resin and low density polyethylene as a percentage of the LLDPE, in accordance with some embodiment.
Figure 11B:
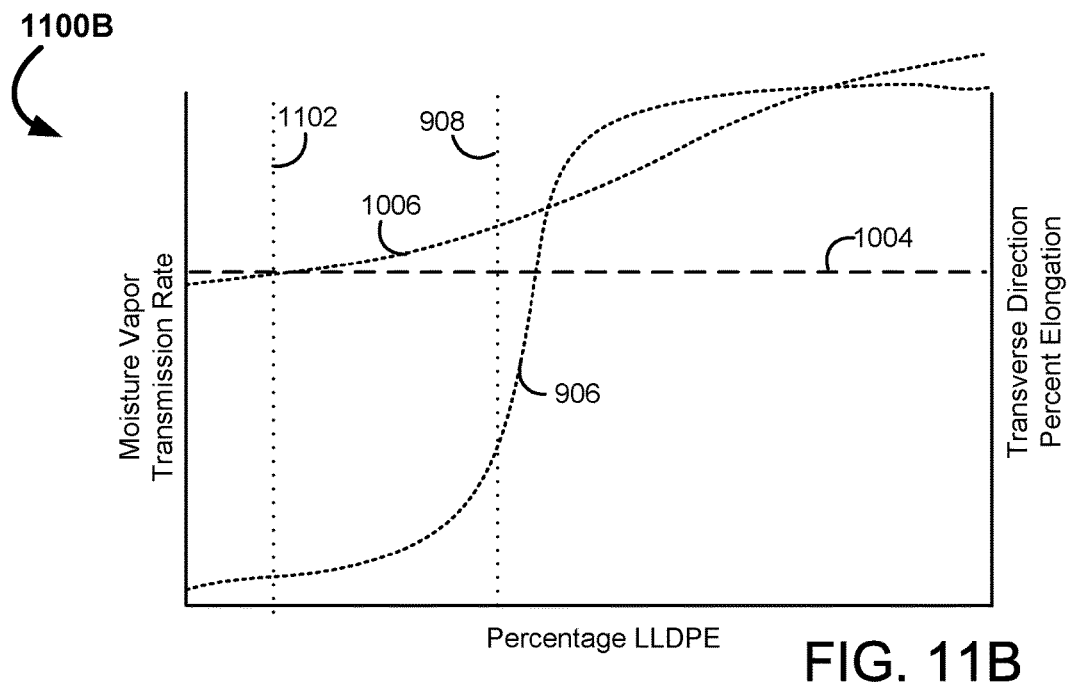

Lastly, FIGS. 11A and 11B are representational overlay diagrams of the moisture vapor transmission rate and the transverse directional percent elongation of a polyethylene film including high barrier resin and low density polyethylene as a percentage of the LLDPE, shown generally at 1100. As the curve 902 for transverse directional percent elongation is steeper than that of the curve 1002 for moisture vapor transmission rate, there is a cross over of the curves. By plotting the maximum threshold 1004 for moisture transmission, and the minimum percent elongation threshold 904 it becomes clear that there is a range 1104 of values for the percentage of LLDPE that the film may exhibit and still meet durability and barrier requirements. This range 1104 extends from the minimum percentage of LLDPE which provides a minimum threshold 904 for transverse direction percent elongation, to the percentage threshold 1102 where the film exceeds the maximal moisture vapor transmission rate.

Note that the curves and thresholds are dependent upon film thickness, the use of additives, modification of polymer molecular weight, and/or branching. For example, for thicker films the moisture transmission rate curve becomes depressed merely due to the fact that there is more material the moisture must permeate. Likewise, the transverse direction percent elongation threshold may be reduced for thicker films because a thicker film is naturally more durable, in some embodiments. Thus, the range of acceptable percentages of LLDPE to HBR may be entirely dependent upon film thickness, polymer properties, and additives. For the films illustrated at the table of FIG. 17, the core barrier layer is formulated at 25-85% high barrier resin and 15-75% octene linear low density polyethylene or metallocene Polyethylene (mPE). The exact percentages for an optimal film may depend upon film thickness and other layers (including primary substrate layers). For example, if a primary substrate layer on Formula L provides much greater moisture barrier resistance but is susceptible to film cracking, this particular formulation may benefit from a higher percentage of O-LLDPE in the core barrier layer in order to alleviate the stress cracking problems.

III. Production Methods

Figure 12:
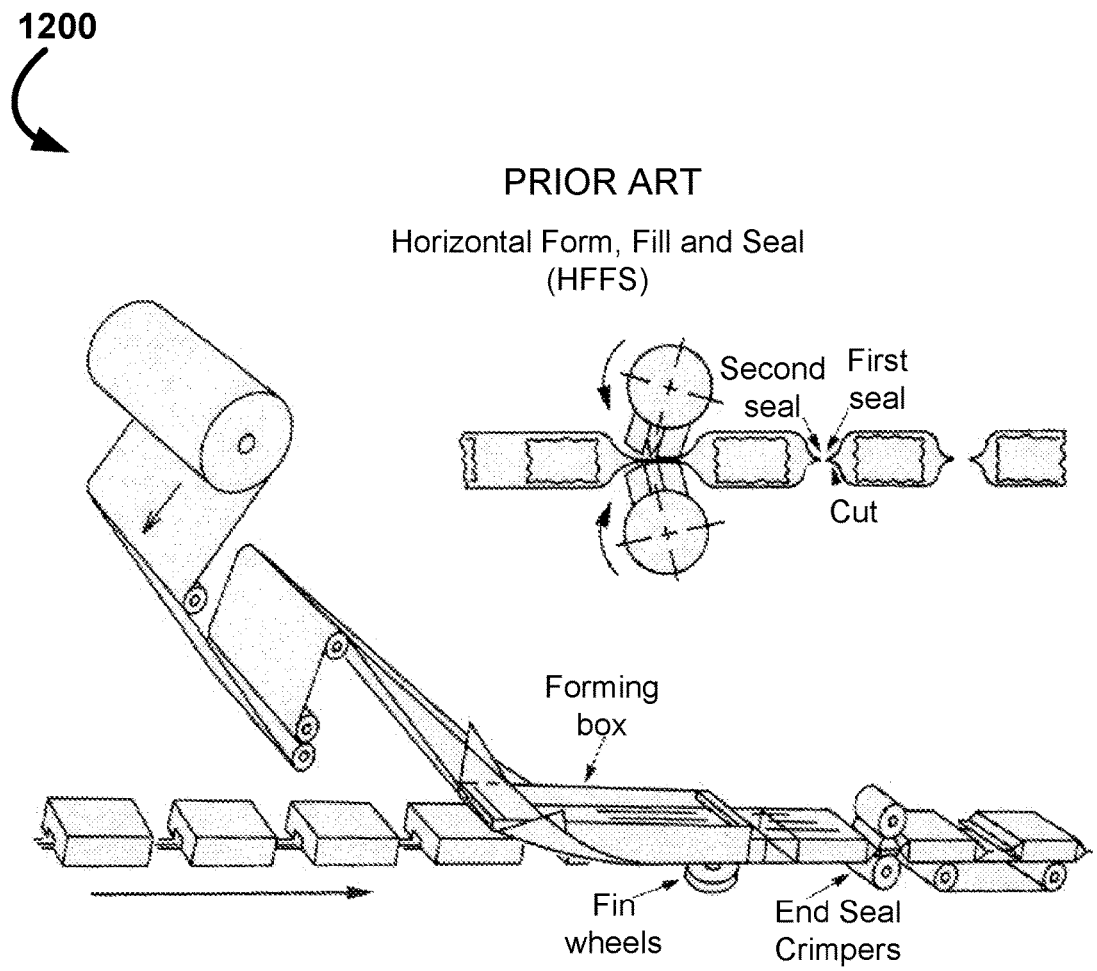
FIG. 12 is a representational diagram of horizontal form, fill and seal system, in accordance with some embodiment.

Now that the formulations of the novel film classes have been described, the disclosure will turn to the methods of film production and medical packaging from the manufactured films. FIG. 12 is a representational diagram of Horizontal Form, Fill and Seal (HFFS) system, shown generally at 1200. The film is provided on a spool and travels down to a framing box which wraps the film around the medical supplies, which are also traveling from the left to the right in this example diagram. Fin wheels heat seal the sides of the film to generate the longitudinal seal, while end seal crimpers seal the top and bottoms of the package and cut each package from one another. Heat seals may be performed at 40 pounds per square inch (psi) with a dwell of two seconds. For many embodiments of the co-extruded improved film, the outer layer became slightly tacky at about 360° F., tacky at about 370° F. and distorted at about 390° F. The inside heat seal layer became slightly tacky at about 260° F., tacky at about 340° F. and fusion sealed at about 360° F.

It should be noted that anywhere a heat seal is employed in this disclosure, alternate sealing methods could additionally be utilized. These include glues, ultrasonic welds, or other bonding mechanisms.

Figure 13:
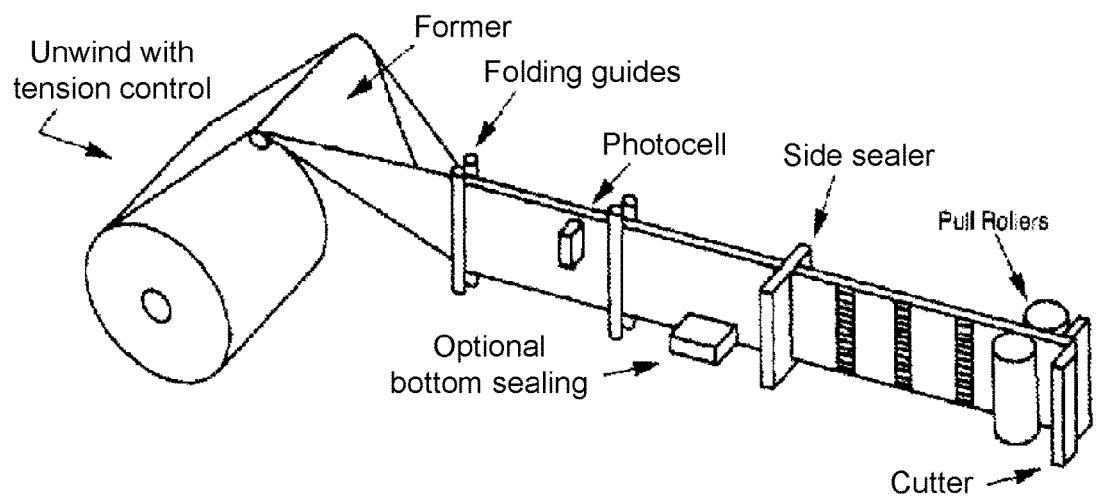
FIG. 13 is a representational diagram of horizontal pouch machine, in accordance with some embodiment.

FIG. 13 is a representational diagram of horizontal pouch machine, shown generally at 1300. Much like the HFFS machine, the horizontal pouch machine begins with a film on spool which is fed to a former. Forming guides line up the film into a pouch orientation. A top sealer heat seals the film. A photocell may be utilized to ensure quality. Additionally, an optional bottom sealer may seal the bottom side of a pouch. A side sealer may heat seal the pouch. The film is drawn along by pull rollers, and lastly the pouches are each cut off by a cutter. After manufacturing, the pouches may be filled along the open side and the pouch may have the final open-end sealed.

Figure 14A:
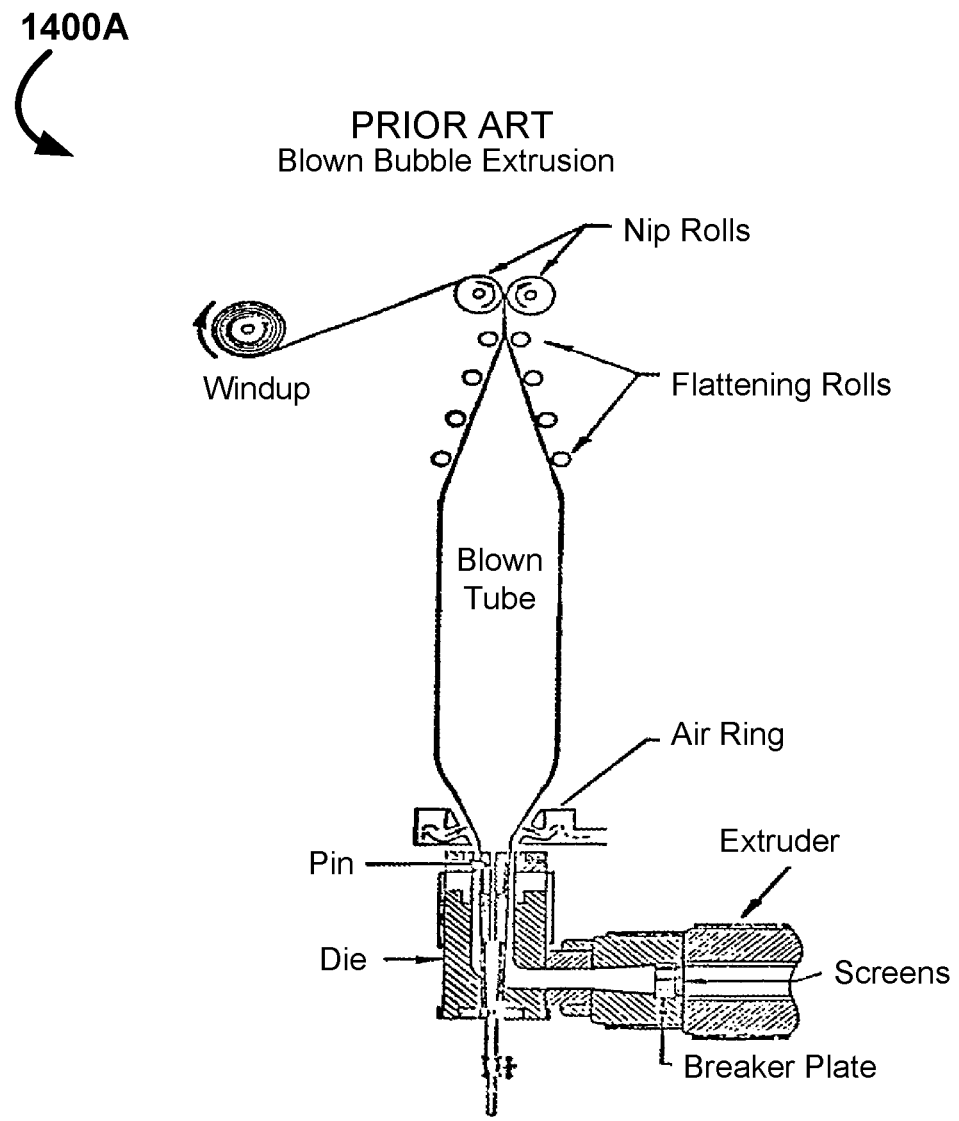
FIGS. 14A and 14B are representational diagrams of a blown bubble extrusion system for the manufacture of films, in accordance with some embodiment.
Figure 14B:
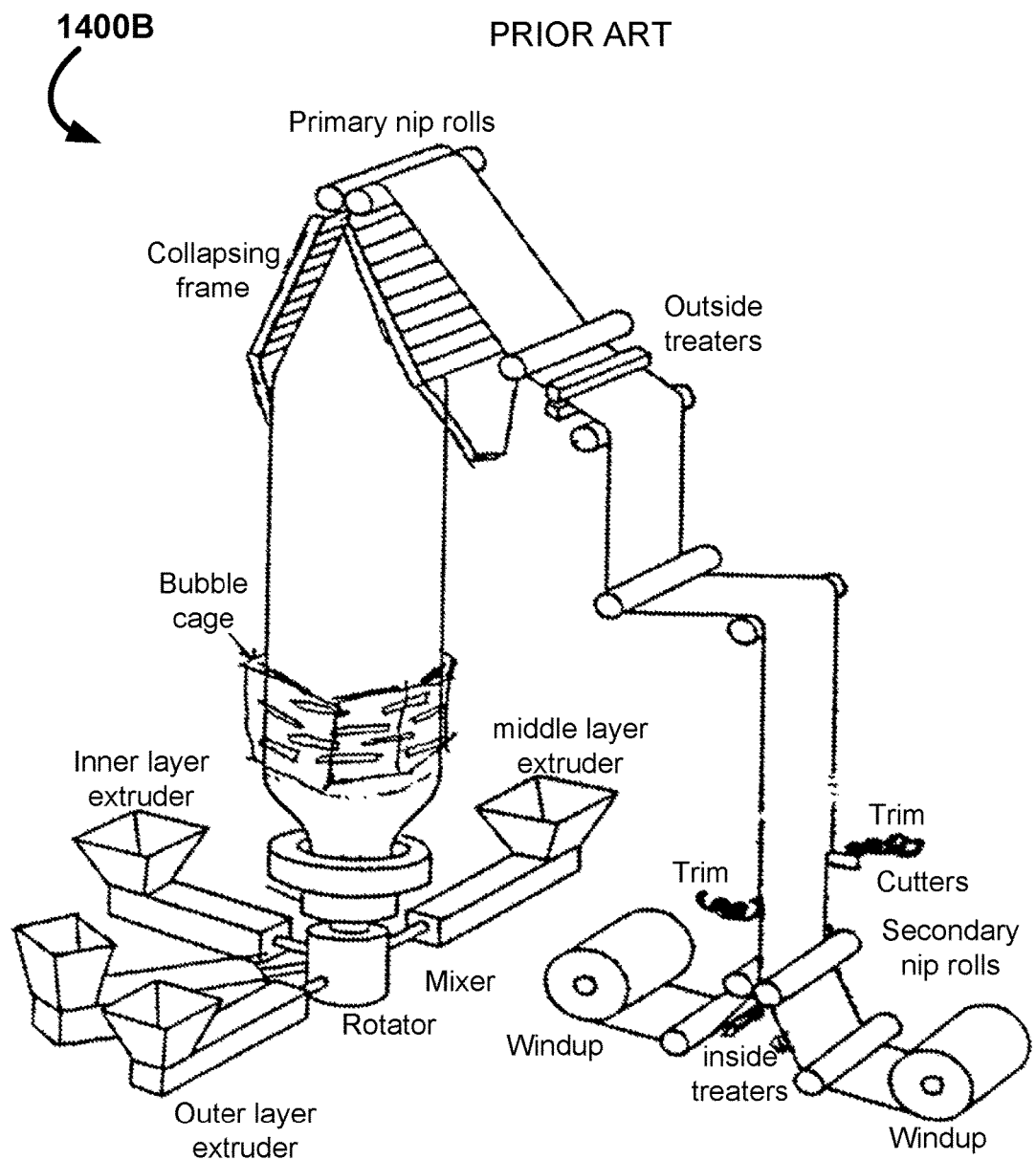

The film utilized by the packaging machine may be manufactured through blown bubble extrusion. FIGS. 14A and 14B are representational diagrams of a blown bubble extrusion system for the manufacture of films, in accordance with some embodiments. FIG. 14A provides a side cutaway diagram of a blown bubble extrusion system, shown generally at 1400A. Melted thermoplastic is forced by an extruder screw through screens to ensure the plastic is uniform and to prevent contaminates from entering the extrusion. As the pressures are very large at the screen, a breaker plate reinforces the screen and prevents extruder failure. The thermoplastic is forced up through a die and air ring. Compressed air is blown into the center of the blown tube such that a bubble is formed. The bubble film is cooled until the film reaches a flattener where it is collapses into a flattened tube. Nip rolls draw the film up and it is wound on a spool for future use.

FIG. 14B illustrates a more detailed isometric view of the blown bubble extrusion system, shown generally at 1400B. Multiple extruders with differing thermoplastic materials provide materials to a rotator such that the materials are co-extruded in the desired layer thickness and geometry. The multiple layer co-extrusion is then forced through the die and into a blown bubble. A bubble cage constrains the bubble and assists in cooling the film to a stable plastic. A collapsing frame folds the cooled bubble to a double layered sheet. Primary nip rollers pull the film upwards. Treaters may then treat the outside surface of the film. Treatment may include application of an epoxy and a laminate layer, as indicated in some embodiments. In some embodiments, the edges of the folded film tube may be trimmed thereby generating two distinct film sheets. Secondary nip rollers assist in moving the film past the trimming cutters and to windup. The inside of the film may be treated as the two film sheets are separated from one another to be wound up on individual spools.

Figure 15:
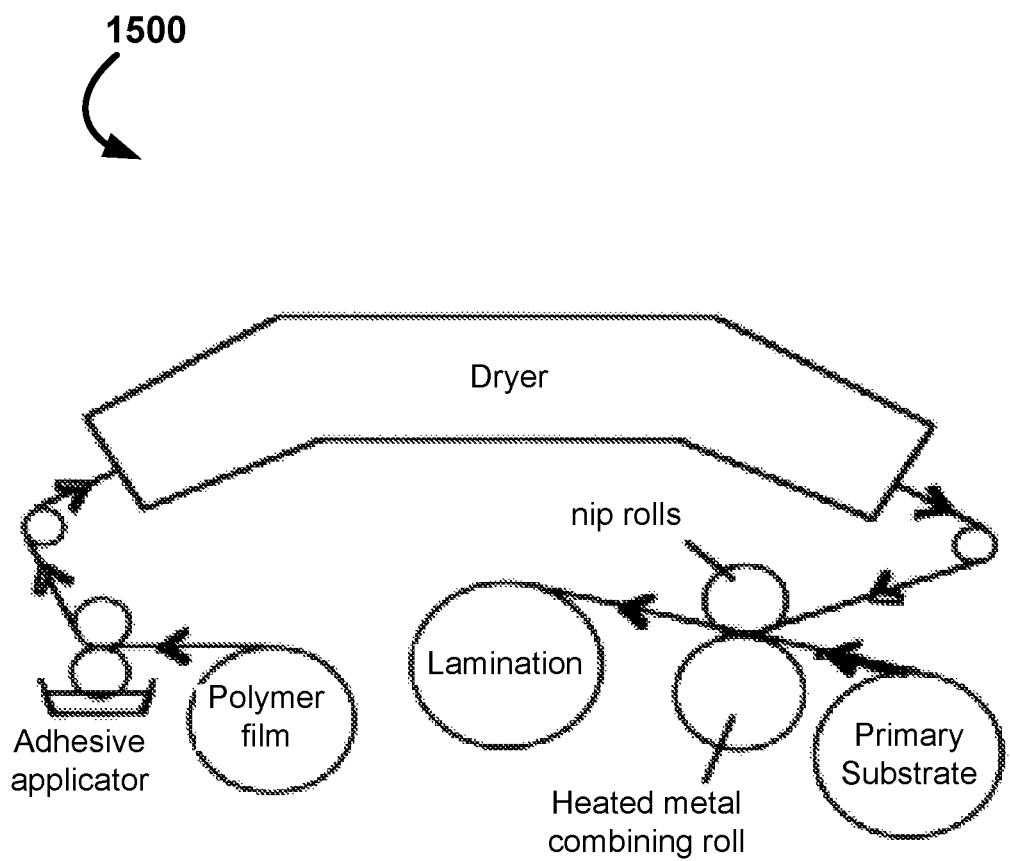
FIG. 15 is a representational diagram of a film laminating machine, in accordance with some embodiment.

In some embodiments it may be desirable to generate a laminated film. A laminated film is generated by adhering a primary substrate to the co-extruded film. An example of a dry bond lamination machine 1500 for the generation of a laminated film is provided at FIG. 15. In this type of laminating machine 1500 the adhesive is usually applied directly rotogravure with an engraved cylinder to one of the two substrates (here the co-extruded polymer film, but the adhesive could be applied to either substrate as desired). The adhesive coat is dried to remove the solvents, and is united to the other substrate using pressure and heat. This effectively bonds the two substrates to generate a laminate film.

Figure 16:
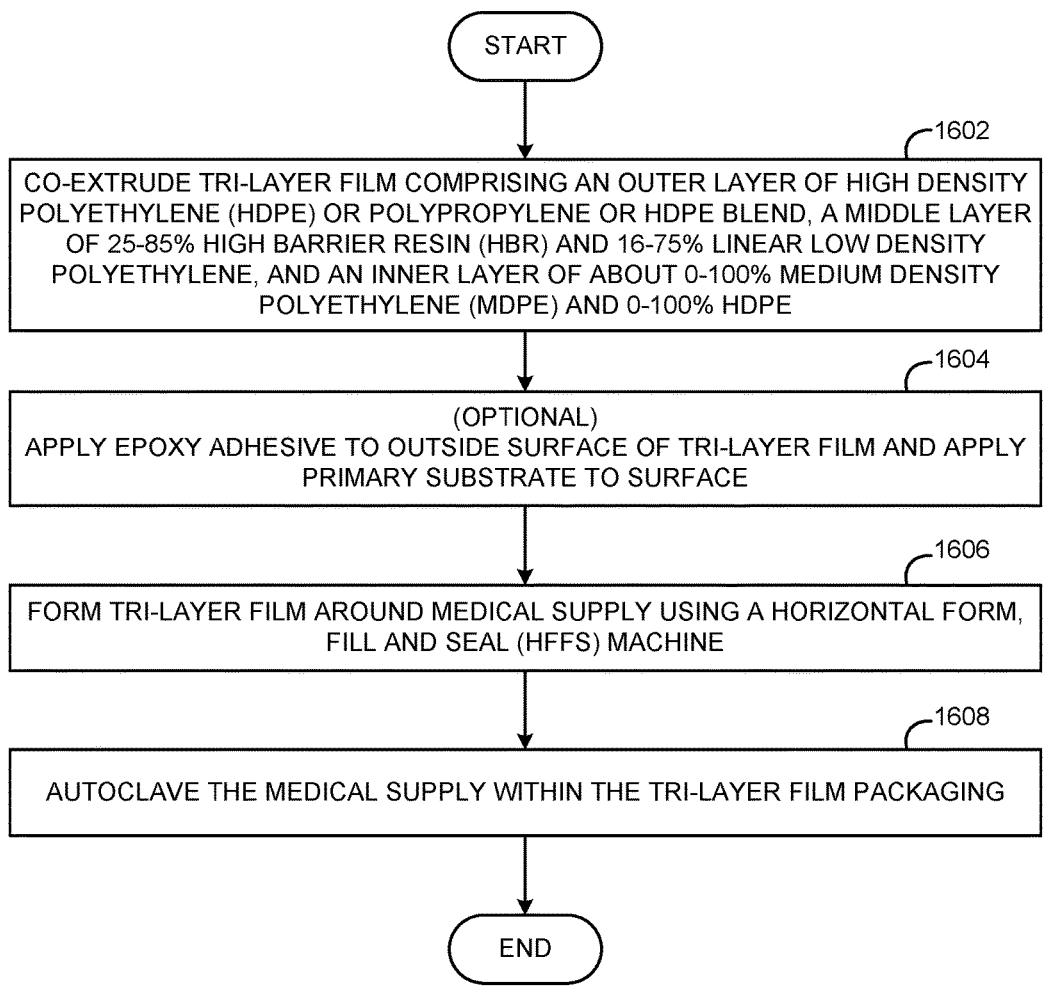
FIG. 16 is an example flowchart for the manufacture of a sterilized medical supply within a film package, in accordance with some embodiment.

Continuing now to FIG. 16, which provides an example flowchart for the manufacture of a sterilized medical supply within a film package, in accordance with some embodiments. In this process the tri layer film is co-extruded (at 1602) into a film comprising an outer heat resistant layer of high density polypropylene, in some embodiments. In alternate embodiments, the outside heat resistant layer comprises a combination of HDPE and linear low density polyethylene. In yet other embodiments, the heat resistant layer may be comprised of polypropylene. The core barrier middle layer is a high barrier resin and linear low density polyethylene mixture. The inside heat seal layer may comprise high density polyethylene, or a combination of HDPE and medium density polyethylene.

Next, optionally, an epoxy layer may be applied to the heat resistant layer or the primary substrate (at 1604). A primary substrate layer may be applied to the heat resistant layer with the epoxy adhesive between the two in order to generate a laminated film. For particular formulations of embodiments of films useful in the manufacturing of medical supply packaging, refer to the table in FIG. 17.

The film may then be formed (at 1606) around the medical supply using a horizontal form, fill and seal machine. Alternatively, the film may be made into a pouch utilizing a pouch machine. The pouch may then be filled and sealed. The medical supply encased within packaging may then be sterilized (at 1608). In some embodiments, sterilization may include autoclaving, irradiating or other suitable sterilization technique.

In sum, the present invention provides a system and methods for the manufacture of improved films for packaging medical supplies. The advantages of such a system and methods include the ability to reduce material costs through reduced film thickness, while still retaining moisture barrier fidelity and improving manufacturing tolerances.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A film comprising:
   a heat seal layer comprising approximately 30% medium density polyethylene between 0.926-0.940 g/cm$^3$ and approximately 70% high density polyethylene greater than 0.950 g/cm$^3$;
   a heat resistant layer comprising approximately 70% high density polyethylene and approximately 30% linear low density polyethylene of approximately 0.920 g/cm$^3$;
   a barrier layer between the heat seal layer and the heat resistant layer comprising a blend of 20% linear low density polyethylene and 80% of a second polymer having a relatively high density of at least 0.966 g/cc, wherein the heat seal layer, the barrier layer and heat resistant layer are coextruded at a thickness approximately 3.5 mils at a ratio of approximately 20-60-20 respectively, and have a calculated moisture vapor transmission rate of approximately 0.059 g/100 in$^2$/24 hours/atm;
   a substrate with a thickness of approximately 0.48 mils adhered to the heat resistant layer with an adhesive approximately 0.01 mils thick to make a final film, wherein the substrate is polyethylene terephthalate, and wherein the final film has a thickness of approximately 4.1 mils; and
   wherein the final film has a thermal process window that is greater than-ten degrees Celsius 46 41.

2. The film of claim 1, wherein the linear low density polyethylene of the barrier layer is a single-site linear low density polyethylene.

3. The film of claim 2, wherein the single-site linear low density polyethylene of the barrier layer has a density of approximately 0.916 g/cc.

4. The film of claim 2, wherein the single-site linear low density polyethylene of the barrier layer is an octene linear low density polyethylene.

5. The film of claim 1, wherein the linear low density polyethylene of the barrier layer has a metallocene polyethylene.

6. The film of claim 1, wherein the final film has a calculated moisture vapor transmission rate of approximately 0.058 g/100 in$^2$/24 hours/atm.

7. The film of claim 1, wherein the heat seal layer is between 0.644-0.756 mils thick, the barrier layer is between 1.932-3.78 mils thick, and the heat resistant layer is between 0.644-0.756 mils thick.

8. The film of claim 1, wherein the heat seal layer is 0.7 mils thick, the barrier layer is 2.1 mils thick, and the heat resistant layer is 0.7 mils thick.

* * * * *